(12) United States Patent
Ko et al.

(10) Patent No.: US 9,413,442 B2
(45) Date of Patent: Aug. 9, 2016

(54) METHOD AND APPARATUS FOR REPORTING CHANNEL STATE INFORMATION IN A WIRELESS COMMUNICATION SYSTEM

(71) Applicant: LG ELECTRONICS INC., Seoul (KR)

(72) Inventors: Hyunsoo Ko, Anyang-si (KR); Jaehoon Chung, Anyang-si (KR); Minseok Noh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/343,713

(22) PCT Filed: Oct. 10, 2012

(86) PCT No.: PCT/KR2012/008198
§ 371 (c)(1),
(2) Date: Mar. 7, 2014

(87) PCT Pub. No.: WO2013/055093
PCT Pub. Date: Apr. 18, 2013

(65) Prior Publication Data
US 2014/0226746 A1    Aug. 14, 2014

Related U.S. Application Data

(60) Provisional application No. 61/545,554, filed on Oct. 10, 2011.

(51) Int. Cl.
*H04L 12/865* (2013.01)
*H04B 7/04* (2006.01)
*H04B 7/06* (2006.01)
*H04L 5/00* (2006.01)

(52) U.S. Cl.
CPC ............ *H04B 7/0486* (2013.01); *H04B 7/0456* (2013.01); *H04B 7/0626* (2013.01); *H04B 7/0632* (2013.01); *H04B 7/0639* (2013.01); *H04B 7/0645* (2013.01); *H04B 7/0658* (2013.01); *H04L 5/0053* (2013.01)

(58) Field of Classification Search
None
See application file for complete search history.

(56) References Cited

U.S. PATENT DOCUMENTS

2008/0101280 A1    5/2008    Gholmieh et al.
2008/0232503 A1    9/2008    Kim
(Continued)

FOREIGN PATENT DOCUMENTS

KR    10-2009-0016374 A    2/2009

*Primary Examiner* — Omar Ghowrwal
*Assistant Examiner* — Angel Brockman
(74) *Attorney, Agent, or Firm* — Birch, Stewart, Kolasch & Birch, LLP

(57) ABSTRACT

The present invention relates to a wireless communication system, and more particularly, to a method and apparatus for reporting channel state information. A method in which a terminal reports control state information (CSI) in a wireless communication system according to an embodiment of the present invention comprises: a step of determining rank indicator (RI) report timing for cases where a value of a precoding type indicator (PTI) is 0; a step of determining wideband first precoding matrix indicator (PMI) report timing; a step of determining wideband second precoding matrix indicator report timing and wideband channel quality indicator (CQI) report timing; and a step of reporting said CSI based on the result of the determination on the reporting timing. The CSI which is reported firstly after the RI report timing in cases where the value of the PTI is 0 can be set to become said wideband first PMI.

9 Claims, 13 Drawing Sheets

(56) References Cited

U.S. PATENT DOCUMENTS

| | | |
|---|---|---|
| 2009/0052405 A1 | 2/2009 | Ko et al. |
| 2009/0239525 A1* | 9/2009 | Cai ............ H04L 1/1829 455/424 |
| 2009/0245169 A1* | 10/2009 | Zhang .......... H04L 1/0026 370/328 |
| 2011/0176629 A1 | 7/2011 | Bayesteh et al. |
| 2012/0063500 A1* | 3/2012 | Wang et al. .............. 375/224 |
| 2012/0250558 A1* | 10/2012 | Chung .......... H04L 1/0026 370/252 |
| 2012/0314588 A1* | 12/2012 | Nammi .......... H04L 1/0027 370/252 |
| 2012/0320783 A1* | 12/2012 | Wu ............. H04B 7/0689 370/252 |
| 2013/0058295 A1* | 3/2013 | Ko ............. H04B 7/063 370/329 |

* cited by examiner

FIG. 5
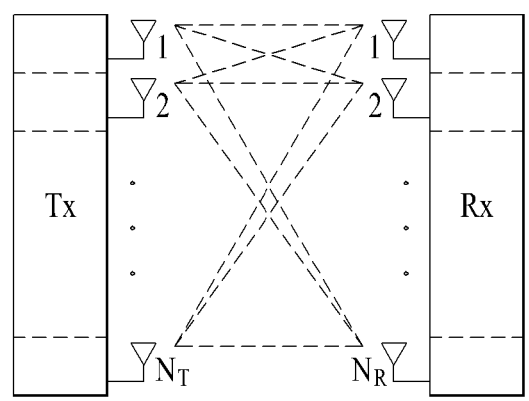
(a)
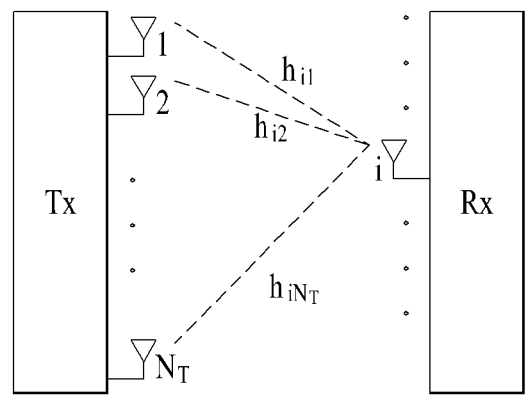
(b)

FIG. 10
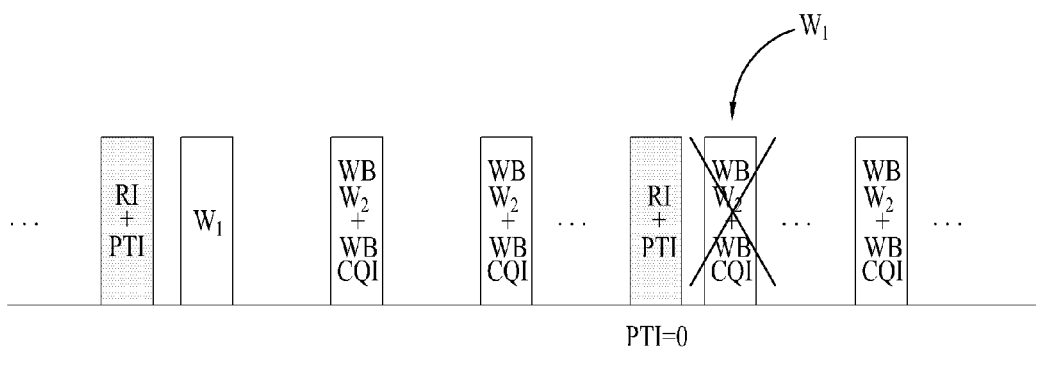
(a)
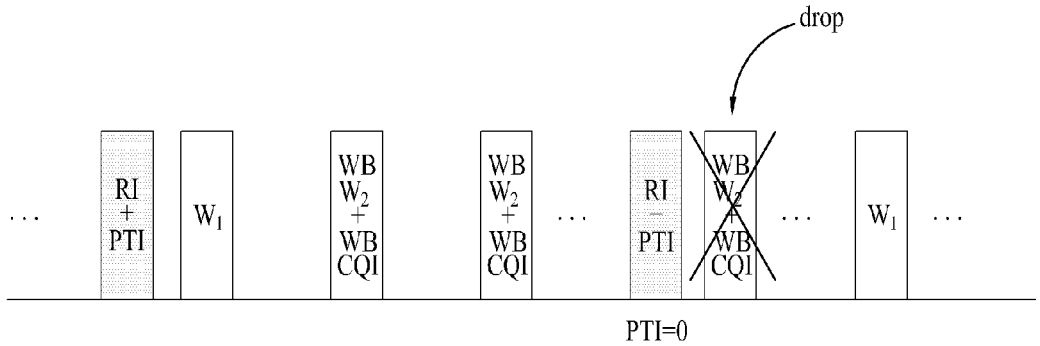
(b)

METHOD AND APPARATUS FOR REPORTING CHANNEL STATE INFORMATION IN A WIRELESS COMMUNICATION SYSTEM

CROSS REFERENCE TO RELATED APPLICATIONS

This application is the National Phase of PCT/KR2012/008198 filed on Oct. 10, 2012, which claims priority under 35 U.S.C. 119(e) to U.S. Provisional Application No. 61/545,554 filed on Oct. 10, 2011, all of which are hereby expressly incorporated by reference into the present application.

TECHNICAL FIELD

The following description relates to a wireless communication system and, more particularly, to a method and apparatus for reporting channel state information.

BACKGROUND ART

MIMO (multiple-input multiple-output) refers to a method for improving transmission/reception efficiency by adopting multiple transmit (Tx) antennas and multiple receive (Rx) antennas rather than using a single Tx antenna and a single Rx antenna. That is, MIMO is a technology for increasing capacity or improving performance by using multiple antennas at a transmitting end or a receiving end of a wireless communication system. MIMO may be referred to as multi-antenna technology. To correctly perform multi-antenna transmission, it is necessary to feed back information on a channel from a receiving end that receives multiple antenna channels.

Information fed back from a receiving end to a transmitting end in a conventional multi-antenna wireless communication system may include a rank indicator (RI), a precoding matrix indicator (PMI), a channel quality indicator (CQI), etc., which may be collectively referred to as channel state information (CSI). The CSI is composed of information suitable for conventional multi-antenna transmission. In general, RI may be determined as a value indicating a most suitable rank in the current channel state, PMI may be determined as a value indicating a most suitable precoding matrix based on the rank, and CQI may be determined as a value indicating a most suitable modulation and coding scheme (MCS) based on the rank and the precoding matrix.

DISCLOSURE

Technical Problem

CSI may be periodically reported through an uplink control channel. Since uplink control channel capacity is limited, a large amount of information cannot be simultaneously transmitted. Accordingly, when the CSI is reported through the uplink control channel, different types of CSI (RI, PMI, CQI, etc.) may be transmitted at different timings. Furthermore, a certain piece of CSI may be calculated/determined based on another piece of CSI. For example, when a precoding matrix is determined by a combination of two PMIs (e.g. W1 and W2), W2 can be determined on the basis of W1. According to the currently defined periodic CSI reporting scheme, W2 may be reported without W1 report when W1 and W2 are reported at different timings. In this case, the PMI corresponding to W2 cannot indicate a correct precoding matrix.

An object of the present invention devised to solve the problem lies in a method and apparatus for correctly and efficiently reporting CSI through correct reporting of a PMI in periodic CSI reporting.

The technical problems solved by the present invention are not limited to the above technical problems and those skilled in the art may understand other technical problems from the following description.

Technical Solution

The object of the present invention can be achieved by providing a method for reporting channel state information (CSI) by user equipment (UE) in a wireless communication system, including: determining reporting timing of a rank indicator (RI) corresponding to a precoding type indicator (PTI) having a value of 0; determining reporting timing of a wideband first precoding matrix indicator (PMI); determining reporting timing of a wideband second PMI and wideband channel quality indicator (CQI); and reporting the CSI based on the result of reporting timing determination, wherein CSI reported first after the reporting timing of the RI corresponding to the PTI having the value of 0 is the wideband first PMI.

In another embodiment of the present invention, provided herein is a UE for reporting CSI in a wireless communication system, including: a reception module for receiving a downlink signal from a base station; a transmission module for transmitting an uplink signal to the base station; and a processor for controlling the UE including the reception module and the transmission module, wherein the processor is configured to determine reporting timing of an RI corresponding to a PTI having a value of 0, to determine reporting timing of a wideband first PMI, to determine reporting timing of a wideband second PMI and wideband CQI and to report the CSI based on the result of reporting timing determination, wherein CSI reported first after the reporting timing of the RI corresponding to the PTI having the value of 0 is the wideband first PMI.

The following may be commonly applied to the above-described embodiments of the present invention.

Reporting of the wideband second PMI and wideband CQI may be dropped after the reporting timing of the RI corresponding to the PTI having the value of 0.

The wideband first PMI may be reported instead of the wideband second PMI and wideband CQI at CSI reporting timing immediately after the reporting timing of the RI corresponding to the PTI having the value of 0.

The reporting period of the wideband first PMI may be $H_0 * N_p$, $H_0$ may be a value signaled by a higher layer and $N_p$ may be a CSI reporting timing interval.

The reporting timing of the wideband second PMI and wideband CQI may be determined as CSI reporting timing between two consecutive wideband first PMI reporting timings.

The reporting period of the RI may be $H_1 * N_p * M_{RI}$, J may denote the number of bandwidth parts, K may be set by higher layer signaling, $N_p$ may be a CSI reporting timing interval, $M_{RI}$ may be a multiple of a wideband CQI and PMI reporting period for a PTI having a value of 1.

CSI reported after reporting timing of an RI corresponding to a PTI having a value of 1 may be determined or calculated on the basis of a rank value of a most recently reported RI corresponding to the PTI having the value of 0.

A rank value with respect to RI report corresponding to a PTI having a value of 1 may be changed from a previous rank value.

The CSI may be periodically reported.

The CSI report may be transmitted using a physical uplink control channel (PUCCH).

The above description and the following description with respect to the present invention are exemplary and for additional explanation of claims.

Advantageous Effects

According to the present invention, it is possible to provide a method and apparatus for correctly and efficiently reporting CSI through correct reporting of a PMI in periodic CSI reporting.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a wireless communication system having multiple antennas;

FIGS. 10 and 11 illustrate operations in PUCCH reporting mode 2-1 according to an embodiment of the present invention;

BEST MODE

Figure 1:
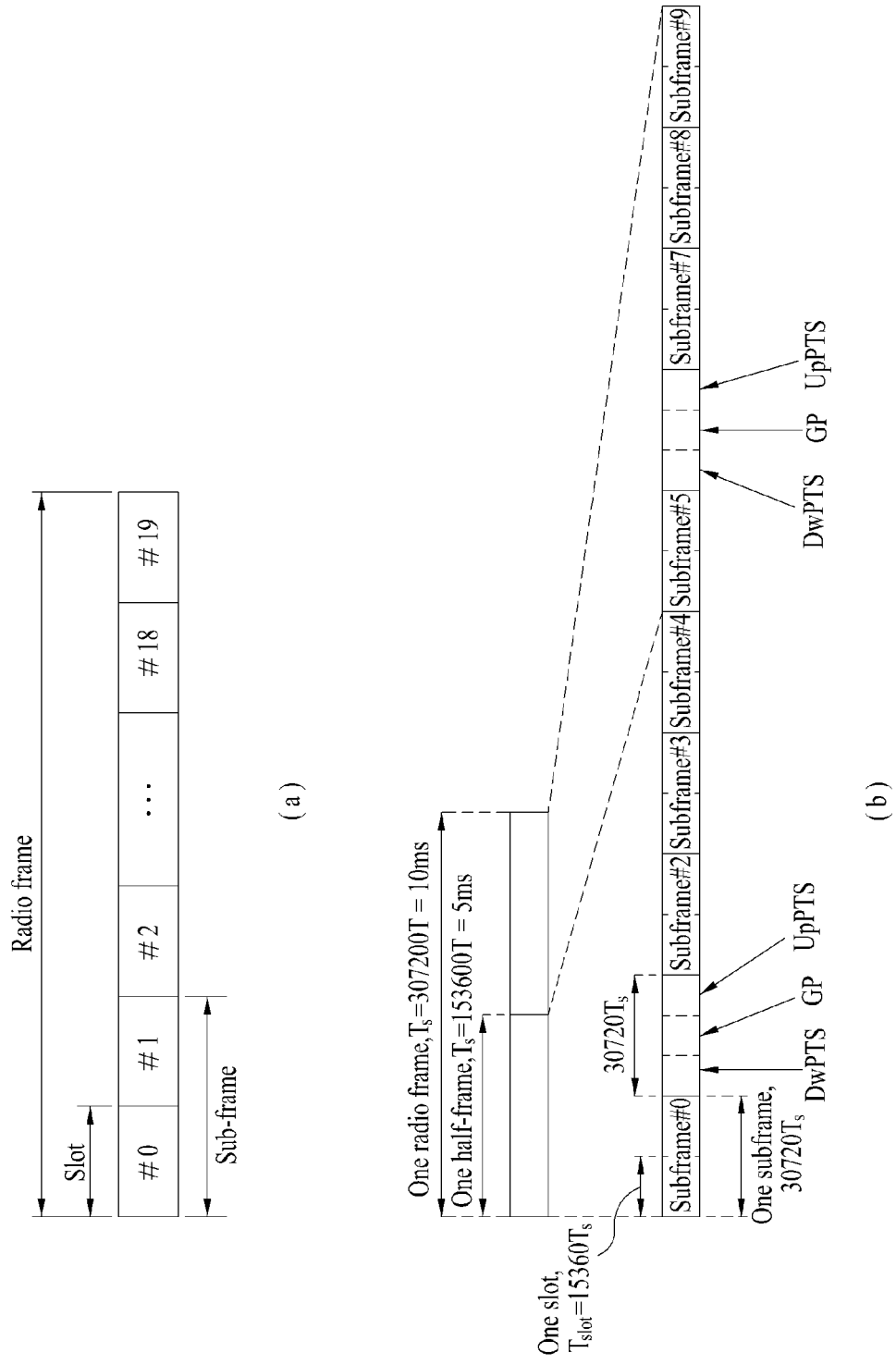
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi™), IEEE 802.16 (WiMAX™), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX™ can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a downlink radio frame structure with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first two or three OFDM symbols in each subframe can be allocated to a PDCCH and the remaining OFDM symbols can be allocated to a PDSCH.

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

This radio frame structure is purely exemplary and thus the number of subframes in a radio frame, the number of slots in a subframe, or the number of OFDM symbols in a slot may vary.

Figure 2:
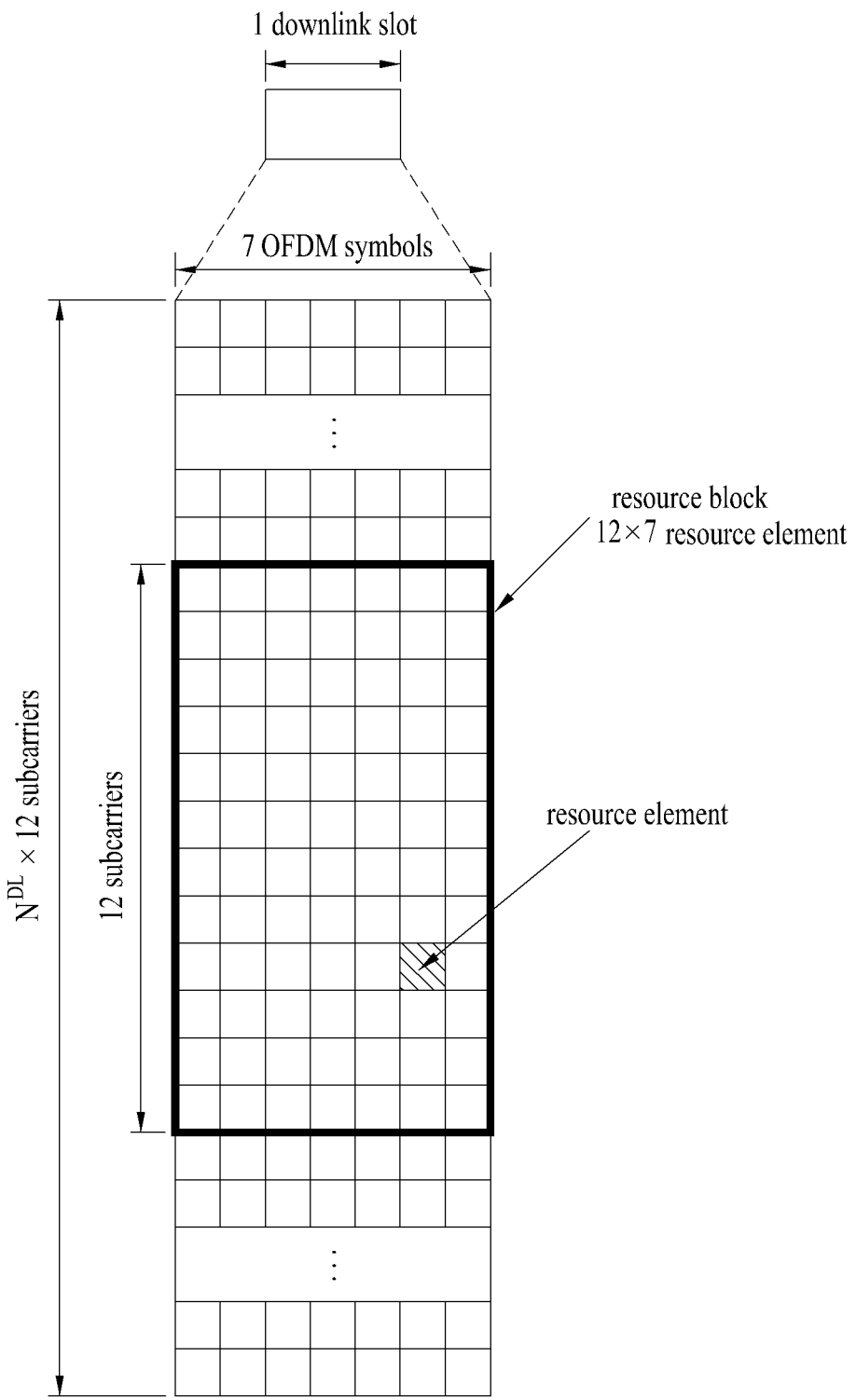
FIG. 2 illustrates a resource grid in a downlink slot.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
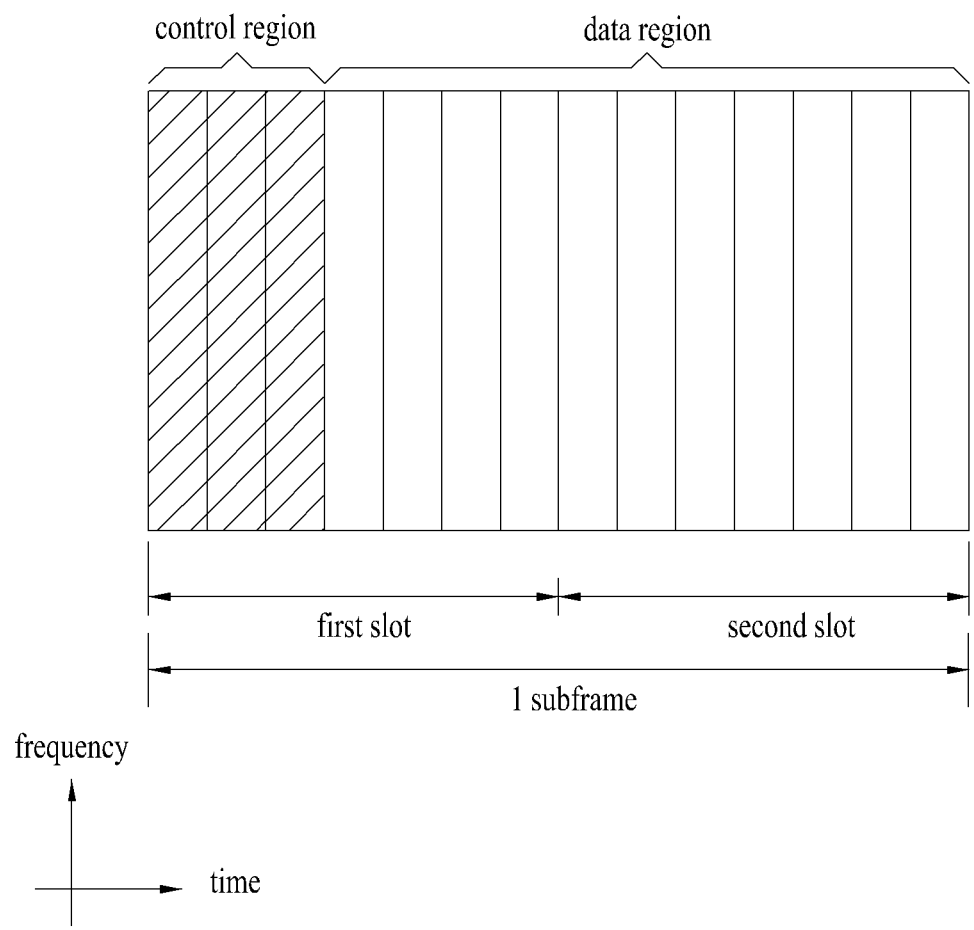
FIG. 3 illustrates a downlink subframe structure.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
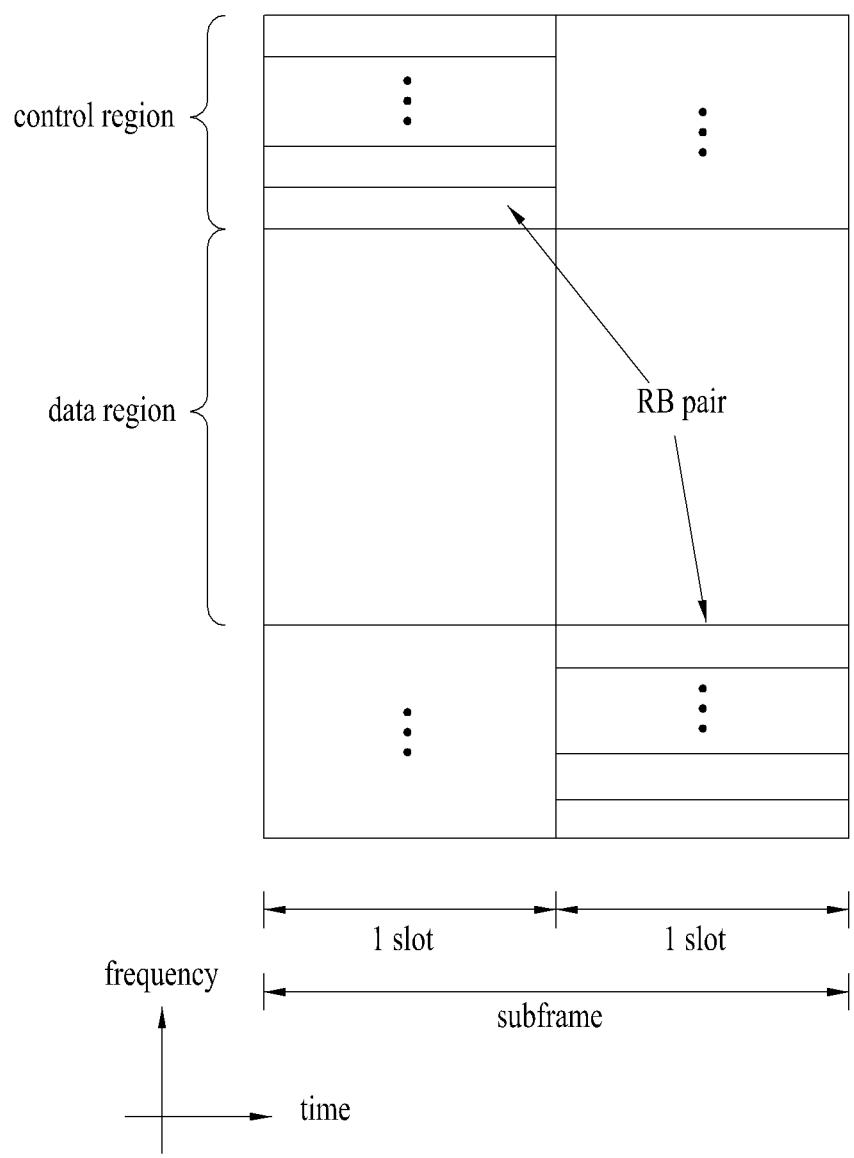
FIG. 4 illustrates an uplink subframe structure.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

MIMO System

FIG. 5 shows the configuration of a wireless communication system including multiple antennas.

Referring to FIG. 5(a), if the number of transmit (Tx) antennas increases to $N_T$, and at the same time the number of receive (Rx) antennas increases to $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ x_{N_T} \end{bmatrix} \quad \text{[Equation 5]}$$

$$= \begin{bmatrix} w_{11} & w_{12} & \ldots & w_{1N_T} \\ w_{12} & w_{12} & \ldots & w_{2N_T} \\ \vdots & & \ddots & \vdots \\ w_{i2} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

When $N_R$ Rx antennas are used, received signals $y_1, y_2, \ldots, y_{N_R}$ of individual antennas can be represented by a specific vector (y) shown in the following equation 6.

$$y = [y_1, y_2, \ldots, y_{N_R}]^T \quad \text{[Equation 6]}$$

In the meantime, if a channel modeling is executed in the MIMO communication system, individual channels can be distinguished from each other according to Tx/Rx antenna indexes. A specific channel passing the range from a Tx antenna j to a Rx antenna i is denoted by $h_{ij}$. In this case, it should be noted that the index order of the channel $h_{ij}$ is located before a Rx antenna index and is located after a Tx antenna index.

Several channels are tied up, so that they are displayed in the form of a vector or matrix. An exemplary vector is as follows. FIG. 5(b) shows channels from $N_T$ Tx antennas to a Rx antenna i.

Referring to FIG. 5(b), the channels passing the range from the $N_T$ Tx antennas to the Rx antenna i can be represented by the following equation 7.

$$h_i^T = [h_{i1}, h_{i2}, \ldots, h_{iN_T}] \quad \text{[Equation 7]}$$

If all channels passing the range from the $N_T$ Tx antennas to $N_R$ Rx antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Additive white Gaussian noise (AWGN) is added to an actual channel which has passed the channel matrix H shown in Equation 8. The AWGN $n_1, n_2, \ldots, n_{N_R}$ added to each of $N_R$ Rx antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ x_{N_T} \end{bmatrix} + \begin{bmatrix} n_1 \\ n_2 \\ \vdots \\ n_i \\ n_{N_R} \end{bmatrix}$$

$$= Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \le \min(N_T, N_R)$$ [Equation 11]

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of information pieces that can be transmitted on a given channel.

In description of the specification, 'rank' with respect to MIMO transmission indicates the number of paths through which signals can be independently transmitted at specific time in a specific frequency resource and 'the number of layers' refers to the number of signal streams transmitted through each path. Since a transmitting end transmits as many layers as the rank used in signal transmission, the rank corresponds to the number of layers unless otherwise mentioned.

Channel State Information (CSI)

MIMO may be classified into open loop and closed loop schemes. Open loop MIMO refers to MIMO transmission performed by a transmitter without CSI feedback of a MIMO receiver. Closed loop MIMO refers to a scheme by which the transmitter receives CSI feedback from the MIMO receiver and performs MIMO transmission. According to closed loop MIMO, the transmitter and receiver can perform beamforming based on CSI to obtain a multiplexing gain of MIMO Tx antennas. The transmitter (e.g. BS) may allocate a UL control channel or UL shared channel to the receiver (e.g. UE) such that the receiver (e.g. UE) can feed back CSI.

The CSI may include RI, PMI and CQI.

RI is information regarding a channel rank which indicates the number of layers (or streams) capable of transmitting different pieces of information through the same time-frequency resource. Since a rank value is determined according to long term fading of a channel, RI can be fed back in a long period (i.e. less frequently) compared to PMI and CQI.

PMI is information regarding a precoding matrix used for data transmission of a transmitter. Precoding refers to mapping of a transport layer to a Tx antenna and layer-antenna mapping relationship may be determined by a precoding matrix. PMI corresponds to a precoding matrix index of a preferred BS of a UE on the basis of metrics such as a signal-to-interference plus noise ratio (SINR). To reduce precoding information feedback overhead, the transmitter and receiver may share a codebook including various precoding matrices and only an index indicating a specific precoding matrix in the codebook may be fed back.

CQI is information regarding channel quality or channel intensity. CQI may be represented by a predetermined MCS combination. That is, a fed back CQI index represents a corresponding modulation scheme and code rate. In general, CQI is a value reflecting reception SINR that can be obtained when a BS configures a spatial channel using PMI.

A system (e.g. LTE-A) supporting extended antenna configuration considers acquisition of additional multi-user diversity using multi-user MIMO (MU-MIMO). In MU-MIMO, an interference channel is present between UEs multiplexed in an antenna domain, and thus it is necessary to prevent generation of interference in a UE when a BS performs DL transmission using CSI fed back from another UE from among multiple users. Accordingly, for correct MU-MIMO operation, CSI with high accuracy needs to be fed back as compared to single user MIMO (SU-MIMO).

For more accurate CSI measurement and reporting, a method of feeding back new CSI obtained by improving the conventional CSI composed of RI, PMI and CQI may be applied. For example, precoding information fed back by a receiver can be indicated by a combination of two PMIs. One (first PMI) of the two PMIs may have a long term and/or wideband property and may be referred to as W1 and the other may have a short term and/or subband property and may be referred to as W2. A final PMI can be determined by a combination (or function) of W1 and W2. For example, if the final PMI is W, then W=W1*W2 or W=W2*W1.

Here, W1 reflects frequency and/or time average characteristics of a channel. In other words, W1 may be defined as CSI that reflects long-term channel characteristics, wideband channel characteristics or long-term and wideband channel characteristics. To simply represent the characteristics of W1, W1 is referred to as long-term wideband CSI (or long-term wideband PMI) in the specification.

W2 reflects relatively instantaneous channel characteristics compared to W 1. In other words, W2 may be defined as CSI that reflects short-term channel characteristics, subband channel characteristics or short-term and subband channel characteristics. To simply represent the characteristics of W2, W2 is referred to as short-term subband CSI (or short-term subband PMI) in the specification.

It is necessary to configure separate codebooks (i.e. a first codebook for W1 and a second codebook for W2) which are respectively composed of precoding matrices respectively representing two pieces of channel information (e.g. W1 and W2) having different attributes in order to determine a final precoding matrix W from the two pieces of channel information (e.g. W1 and W2). The codebooks configured in this manner may be referred to as hierarchical codebooks. In addition, determination of a final codebook using the hierarchical codebooks may be referred to as hierarchical codebook transformation. When the hierarchical codebooks are used, channel feedback with high accuracy can be achieved compared to a case in which a single codebook is used. Single-cell MU-MIMO and/or multi-cell cooperative communication may be supported using channel feedback with high accuracy.

CSI Reporting

In a wireless communication system, a DL reception entity (e.g. UE) can measure reference signal received power (RSRP) of a reference signal transmitted on downlink, reference signal received quality (RSRQ), etc. at an arbitrary time and report a measurement result to a downlink transmission entity (e.g. base station) in a periodic or event triggered manner. Each UE reports downlink channel information based on downlink channel state through uplink and the base station can determine an appropriate time/frequency resource and modulation and coding scheme (MCS) for data transmission per UE.

In case of the legacy 3GPP LTE system (e.g., 3GPP LTE Release-8 system), such channel information may be composed of a channel quality indicator (CQI), a precoding matrix indicator (PMI), and a rank indicator (RI). All or some of CQI, PMI and RI may be transmitted according to a transmission mode of each UE. In addition, such channel information reporting scheme may be divided into periodic reporting and aperiodic reporting upon receiving a request from the base station.

Each UE is set to aperiodic reporting using a CQI request bit having a predetermined size (e.g. I bit), which is included in uplink scheduling information transmitted from the base station to the UE. Each UE can transmit channel information considering a transmission mode thereof to the base station through a PUSCH upon reception of the information from the base station.

In case of periodic reporting, a cycle in which channel information is transmitted via a higher layer signal, an offset of the corresponding period, etc. may be signaled to each UE in units of a subframe, and channel information considering a transmission mode of each UE may be transmitted to the base station over a (PUCCH) at intervals of a predetermined time. When UL transmission data is present in a subframe in which channel information is transmitted at intervals of a predetermined time, the corresponding channel information may be transmitted together with data over a PUSCH rather than a PUCCH. In case of the periodic reporting over a PUCCH, a limited number of bits may be used as compared to PUSCH.

If periodic reporting collides with aperiodic reporting in the same subframe, only aperiodic reporting may be performed.

In order to calculate a WB CQI/PMI, the most recently transmitted RI may be used. In a PUCCH reporting mode, RI may be independent of another RI for use in a PUSCH reporting mode. RI is valid only for CQI/PMI for use in the corresponding PUSCH reporting mode.

The CQI/PMI/RI feedback type for the PUCCH reporting mode may be classified into four feedback types. Type 1 is CQI feedback for a user-selected subband. Type 2 is WB CQI feedback and WB PMI feedback. Type 3 is RI feedback. Type 4 is WB CQI feedback.

Referring to Table 1, in the case of periodic reporting of channel information, a reporting mode is classified into four reporting modes 1-0, 1-1, 2-0 and 2-1) according to CQI and PMI feedback types.

TABLE 1

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI >1, CQI of first codeword | Mode 1-1<br>RI<br>Wideband CQI (4 bit)<br>Wideband spatial CQI (3 bit) for RI >1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI >1, CQI of first codeword | Mode 2-1<br>RI<br>Wideband CQI (4 bit)<br>Wideband spatial CQI (3 bit) for RI >1<br>Wideband PMI (4 bit)<br>Best-1 CQI (4 bit) 1 in each BP<br>Best-1 spatial CQI (3 bit) for RI >1<br>Best-1 indicator (L-bit label) |

The reporting mode is classified into a wideband (WB) CQI and a subband (SB) CQI according to a CQI feedback type. The reporting mode is classified into a No-PMI and a single PMI according to transmission or non-transmission of PMI. As can be seen from Table 1, 'NO PMI' may correspond to an exemplary case in which open loop (OL), transmit diversity (TD), and a single antenna are used, and 'single PMI' may correspond to an exemplary case in which closed loop (CL) is used.

Mode 1-0 may indicate an exemplary case in which PMI is not transmitted and only WB CQI is transmitted. In case of Mode 1-0, RI may be transmitted only in the case of OL spatial multiplexing (SM), and one WB CQI denoted by 4 bits may be transmitted. If RI is higher than '1', CQI for a first codeword may be transmitted. In Mode 1-0, feedback type 3 and feedback type 4 may be multiplexed at different time points within the predetermined reporting period, and then transmitted (this may be referred to as time division multiplexing (TDM)-based channel information transmission).

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB spatial differential CQI may be transmitted. In case of transmission of two codewords, the WB spatial differential CQI may indicate a differential value between a WB CQI index for codeword 1 and a WB CQI index for codeword 2. These differential values may be assigned to the set {−4, −3, −2, −1, 0, 1, 2, 3}, and each differential value may be assigned to any one of values contained in the set and be represented by 3 bits. In case of Mode 1-1, feedback type 2 and feedback type 3 may be multiplexed at different time points within the predetermined reporting period, and then transmitted.

Mode 2-0 may indicate that no PMI is transmitted and CQI of a UE-selected band is transmitted. In this case, RI may be transmitted only in case of open loop spatial multiplexing (OL SM), and a WB CQI denoted by 4 bits may be transmitted. In each bandwidth part (BP), best-1 CQI may be transmitted. Best-1 CQI may be denoted by 4 bits. In addition, an indicator of L bits indicating best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and CQI of a UE-selected band are transmitted. In this case, WB CQI of 4 bits, WB spatial differential CQI of 3 bits, and WB PMI of 4 bits are transmitted simultaneously with RI transmission. In addition, best-1 CQI of 4 bits and a best-1 indicator of L bits may be simultaneously transmitted at each bandwidth part (BP). If RI is higher than '1', best-1 spatial differential CQI of 3 bits may be transmitted. During transmission of two codewords, a differential value between a best-1 CQI index of codeword 1 and a best-1 CQI index of codeword 2 may be indicated. In Mode 2-1, the above-mentioned feedback type 1, feedback 2, and feedback type 3 may be multiplexed at different time points within a predetermined reporting period, and then transmitted.

For more accurate CSI feedback in an advanced wireless communication system, a precoding matrix may be determined according to a combination of two PMIs, as described above. A description will be given of PUCCH reporting modes applicable in this case.

When a multi-unit precoder indicator (i.e. W1 and W2) is reported to the base station, different feedback modes can be indicated using a precoder type indicator (PTI) bit.

In a feedback mode, RI, W1 and W2/CQI are transmitted in different subframes and W1, W2 and CQI are set to WB information. In another feedback mode, W2 and CQI are reported with the same subframe granularity of W2/CQI corresponds to WB or SB according to reported subframe. That is, feedback modes as shown in Table 2 can be defined. PUCCH reporting modes shown in Table 6 may be considered as advanced forms of PUCCH reporting mode 2-1 of FIG. 5.

TABLE 2

| Report 1 | Report 2 | Report 3 |
| --- | --- | --- |
| RI + PTI = 0 | Wideband W1 | Wideband W2 + Wideband CQI |
| RI + PTI = 1 | Wideband W2 + Wideband CQI | Subband W2 + Subband CQI |

In Table 2, Report 1, Report 2 and Report 3 represent information reported at a CSI reporting timing. That is, one of Report 1, Report 2 and Report 3 can be reported at a CSI reporting timing.

When PTI is 0 in Table 2, RI and PTI may be transmitted in Report 1, WB W1 may be transmitted at an arbitrary time (Report 2), and then WB W2 and WB CQI may be transmitted at an arbitrary time (Report 3). In addition, WB W1 may be reported in a predetermined period within RI reporting period and WB W2 and WB CQI may be reported at the remaining CSI reporting timing.

Figure 6:
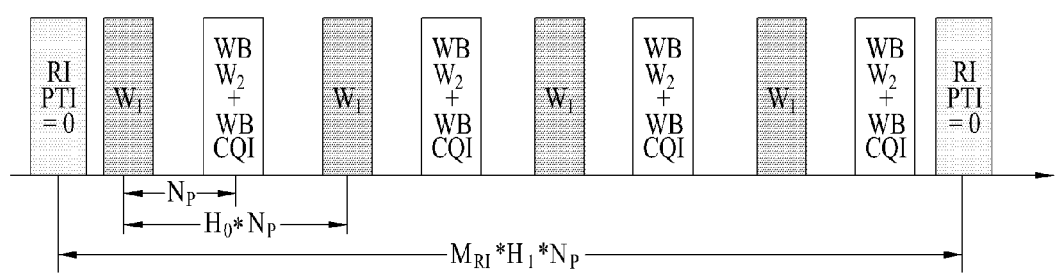
FIG. 6 illustrates a feedback structure according to PUCCH reporting mode 2-1 when PTI=0.

FIG. 6 illustrates a feedback structure according to PUCCH reporting mode 2-1 in case of PTI=0.

As shown in FIG. 6, it can be assumed that CSI is reported at intervals of $N_p$ subframes (i.e. $N_p$ ms). This means that a predetermined reference period in which CSI is reported corresponds to $N_p$ subframes irrespective of types of WB W2 and WB PMI/CQI. Report 2 (i.e. WB W1 report) is transmitted in a subframe that satisfies the following equation 12.

$$(10 \times n_f + \lfloor n_s/2 \rfloor - N_{OFFSET}) \bmod (H \cdot N_P) = 0 \quad [\text{Equation 12}]$$

In Equation 12, $n_f$ is a subframe number, $n_s$ is a slot number and $N_{OFFSET}$ represents a relative offset with respect to Report 2 (i.e. WB W1 report) and Report 3 (i.e. WB W2 and WB CQI report). As can be seen from Equation 12, Report 2 has a period of $H \cdot N_P$ and H for PTI=0 is determined by a higher layer signal (H applied to a case of PTI=0 can be represented as $H_0$). In addition, Report 3 may be reported (H-1 times) at CSI reporting timing between two consecutive Report 2s. FIG. 6 shows an exemplary case in which H=2.

When PTI is 1 in Table 2, RI and PTI may be transmitted in Report 1, WB W1 and WB CQI may be transmitted at an arbitrary time (Report 2), and then SB W2 and SB CQI may be transmitted at an arbitrary time (Report 3).

Figure 7:
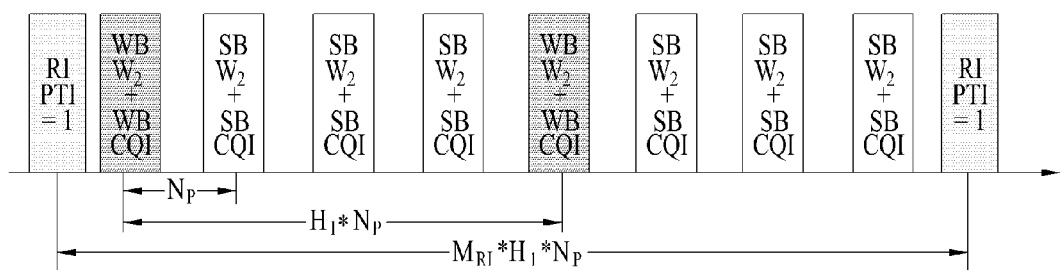
FIG. 7 illustrates a feedback structure according to PUCCH reporting mode 2-1 when PTI=1.

FIG. 7 illustrates a feedback structure according to PUCCH reporting mode 2-1 in case of PTI=1.

As shown in FIG. 7, it is assumed that the CSI reporting period is $N_p$ subframes. Report 2 (i.e. WB W2 and WB CQI report) is transmitted in a subframe that satisfies Equation 12. Here, H in case of PTI=1 is defined as the following equation 13.

$$H = J \cdot K + 1 \quad [\text{Equation 13}]$$

In Equation 13, J denotes the number of bandwidth parts and K is provided by a higher layer. If H applied to a case of PTI=1 is $H_1$, Report 2 has a period of $H_1 \cdot N_P (=(J \cdot K+1) \cdot N_P)$. In addition, Report 3 may be reported at $J \cdot K$ CSI reporting timings between two consecutive Report 2. FIG. 7 shows an exemplary case in which J=3 and K=1.

A Report 1 (RI and PTI) reporting period is defined as an integer multiple ($M_{RI}$) of a WB PMI/CQI reporting period when PTI=1. That is, the RI reporting period is defined as $H \cdot N_P \cdot M_{RI}$ (that is, $H_1 \cdot N_P \cdot M_{RI} = (J \cdot K+1) \cdot N_P \cdot M_{RI}$) in both cases of PTI=0 and PTI=1. In addition, RI reporting timing may be determined according to a predetermined offset $N_{OFFSET,RI}$ based on WB PMI/CQI reporting timing. Accordingly, RI can be reported in a subframe that satisfies the following equation 14.

$$(10 \times n_f + \lfloor n_s/2 \rfloor - N_{OFFSET} - N_{OFFSET,RI}) \bmod (H_1 \cdot N_P \cdot M_{RI}) = 0 \quad [\text{Equation 14}]$$

Improved CSI Reporting Scheme

In periodic CQI reporting, CSI to be transmitted may be determined/calculated on the basis of most recently transmitted CSI. In other words, CSI to be transmitted has dependency on previously reported information. For example, when PUCCH reporting mode 2-1 (refer to Table 2) is applied and PTI=0, WB W2 and WB CQI are determined/calculated on the basis of most recently reported W1. In the example as shown in FIG. 6, WB W2 and WB CQI reports can be determined/calculated based on most recently reported W1.

CSI on which another CSI piece that needs to be determined/calculated depends may not be reported. For example, a CQI reported along with W2 is calculated on the assumption that a precoding matrix determined by W2 reported along with the same and previously reported W1 is applied. However, when W1 is not reported prior to the CQI and W2, W2 or CQI cannot be correctly calculated since information on which calculation of W2 or CQI is based is not present. It can be assumed that a previous channel state suitable for rank-1 transmission is changed to a current channel state suitable for rank-2 transmission. In this case, if W1 suitable for rank 2 is not reported after reporting of an RI for rank 2, then W2 and CQI suitable for rank 2 cannot be correctly determined/calculated. If W2 and CQI are determined/calculated on the basis of most recently reported W1, W2 and CQI cannot reflect the current channel state suitable for rank-2 transmission because the most recently reported W1 is suitable for previous rank-1 transmission, resulting in incorrect CSI reporting. Accordingly, when reporting of CSI that is a basis of determination/calculation of another CSI is dropped or is not performed, it is necessary to clearly determine whether to report the corresponding CSI and information on which determination/calculation of CSI is based when the CSI is reported.

The present invention provides schemes for correctly and efficiently reporting CSI by improving currently defined PUCCH reporting mode 2-1 to solve the aforementioned problem.

According to above-described definition of PUCCH reporting mode 2-1, an RI and PTI reporting period when PTI=0 has dependency on a WB W2 and WB CQI reporting period $(H_1 * N_p = (J*K+1)*N_p)$ when PTI=1. That is, the RI and PTI reporting period when PTI=0 is determined as $M_{RI} * H_1 * N_p = M_{RI} * (J*K+1) * N_p$.

Figure 8:
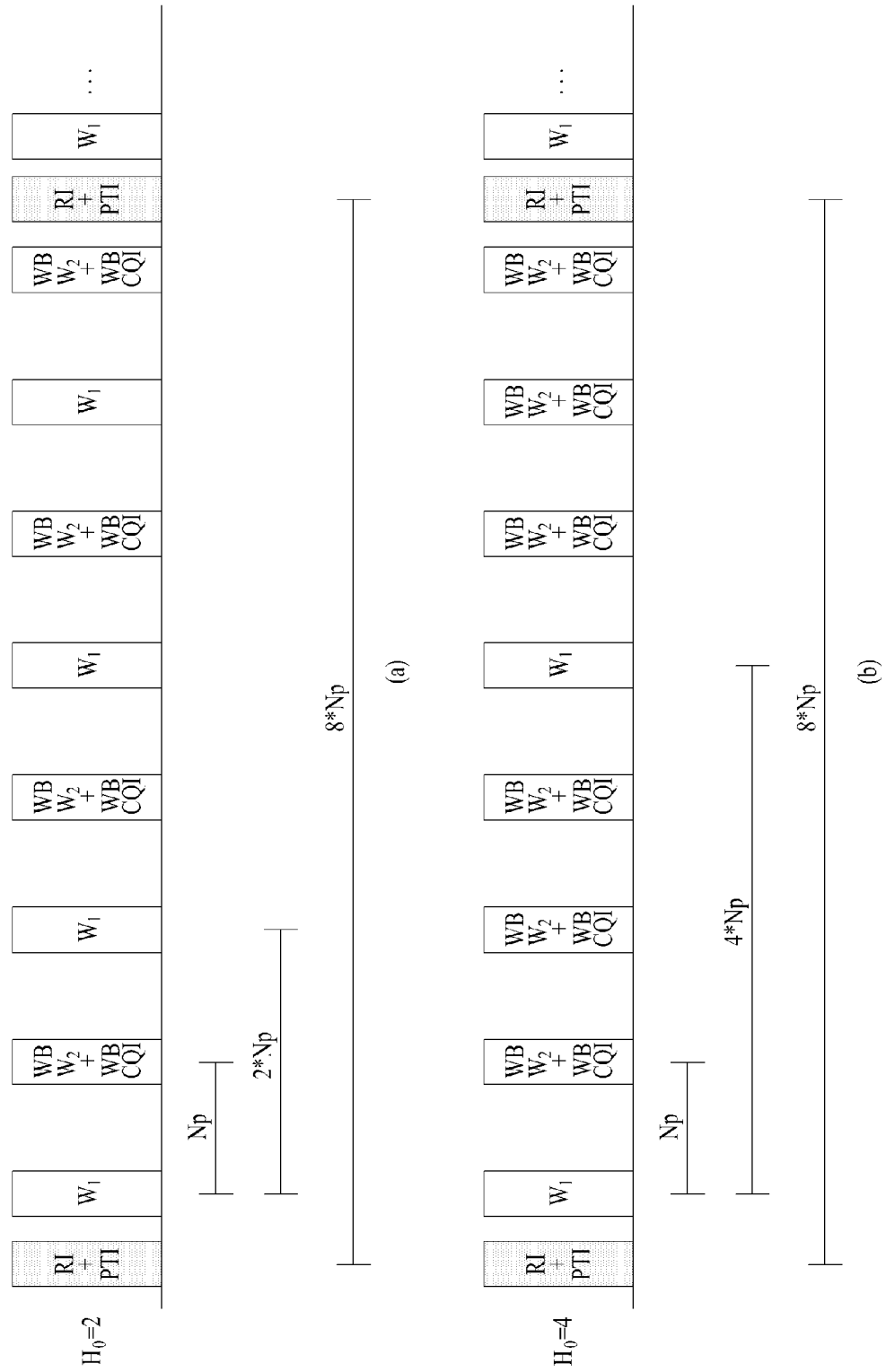
FIG. 8 illustrates an example of PUCCH reporting mode 2-1 according to H (i.e. H0) when PTI=0.

FIG. 8 illustrates an example of PUCCH reporting mode 2-1 according to H (i.e. $H_0$) when PTI=0. The example shown in FIG. 8 is based on the assumption that J=7, K=1 and $M_{RI}$=1. In this case, an RI reporting period is $M_{RI} * H_1 * N_p = 1 * (J*K+1)*N_p = 8*N_p$. That is, the RI and PTI are reported at interval of 8 reporting period ($8*N_p$) and W1 reporting or W2 and CQI reporting is performed at eight CSI transmission timings in the reporting period. The W1 reporting period is determined by $H_0$ signaled through a higher layer.

FIG. 8(a) shows a case in which $H_0$ is set to 2 by the higher layer. That is, W1 is reported at intervals of $2*N_p$ and WB W2 and WB CQI are reported at the remaining CSI reporting timings. Accordingly, W1 can be reported after RI/PTI reporting.

FIG. 8(b) shows a case in which $H_0$ is set to 4 by the higher layer. That is, W1 is reported at intervals of $4*N_p$ and WB W2 and WB CQI are reported at the remaining CSI reporting timings. Accordingly, W1 can be reported after RI/PTI reporting.

As described above, the RI and PTI reporting period is determined on the basis of the WB W2/CQI reporting period when PTI=1. Accordingly, the RI/PTI reporting period and W1 or W2/CQI reporting period are determined based on separately signaled values without being correlated with each other in PUCCH reporting mode 2-1 corresponding to PTI=0. That is, the RI/PTI reporting period is determined based on J and K corresponding to PTI=1 and W1 or W2/CQI reporting period is determined depending on $H_0$. Since J and K are not correlated with $H_0$, W2/CQI reporting may be performed instead of w1 reporting after RI/PTI reporting in PUCCH reporting mode 2-1 corresponding to PTI=0. In this case, determination/calculation of W2/CQI reported when W1 is not reported may not be correctly performed because information on which determination/calculation of W2/CQI is based is not decided. In particular, in the event that the RI is changed, correct determination/calculation of W2/CQI cannot be performed when W2/CQI is reported without reporting W1 suitable for the changed RI.

Figure 9:
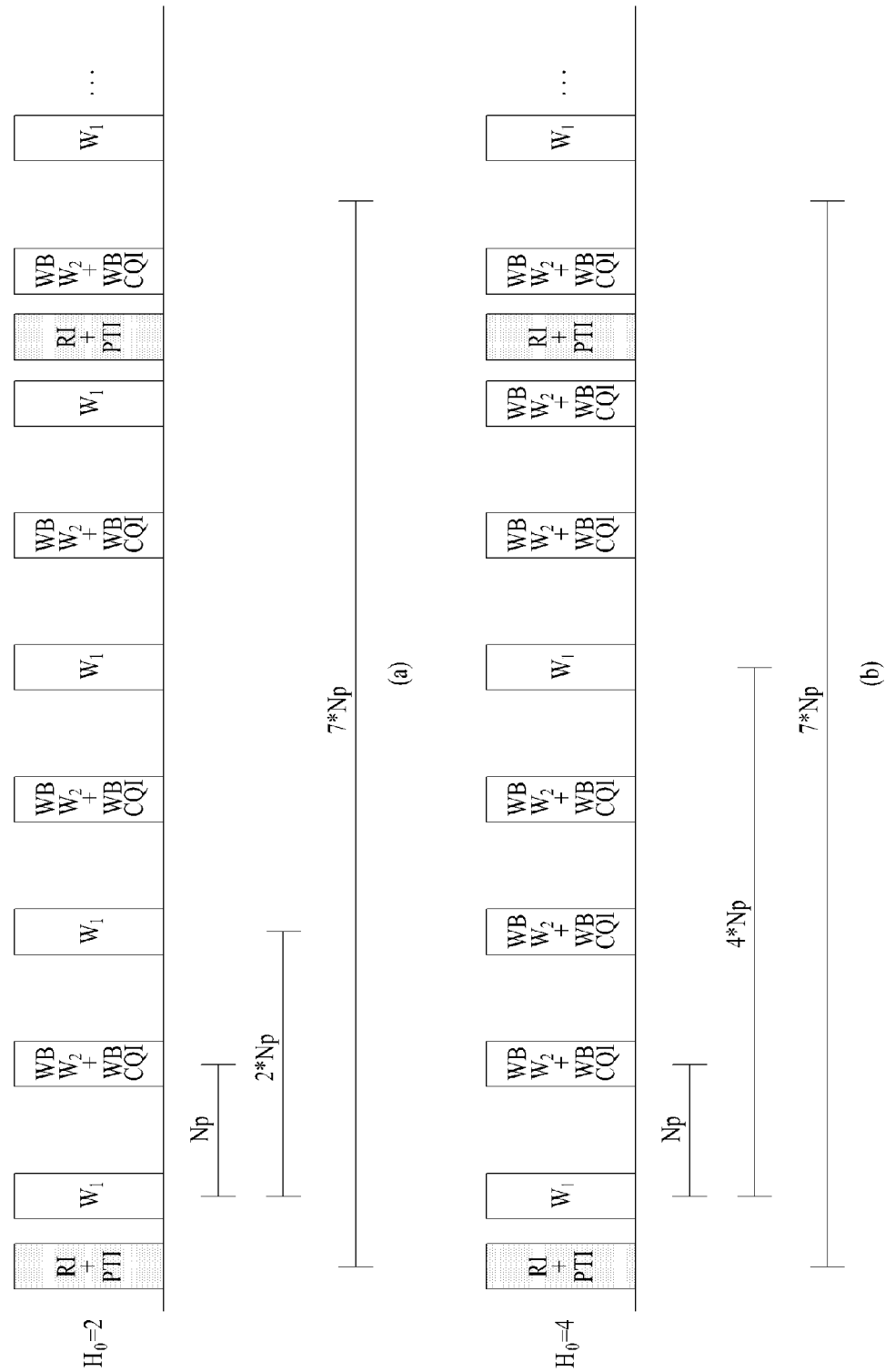
FIG. 9 illustrates another example of PUCCH reporting mode 2-1 according to He (i.e. H0) when PTI=0.
Figure 13:
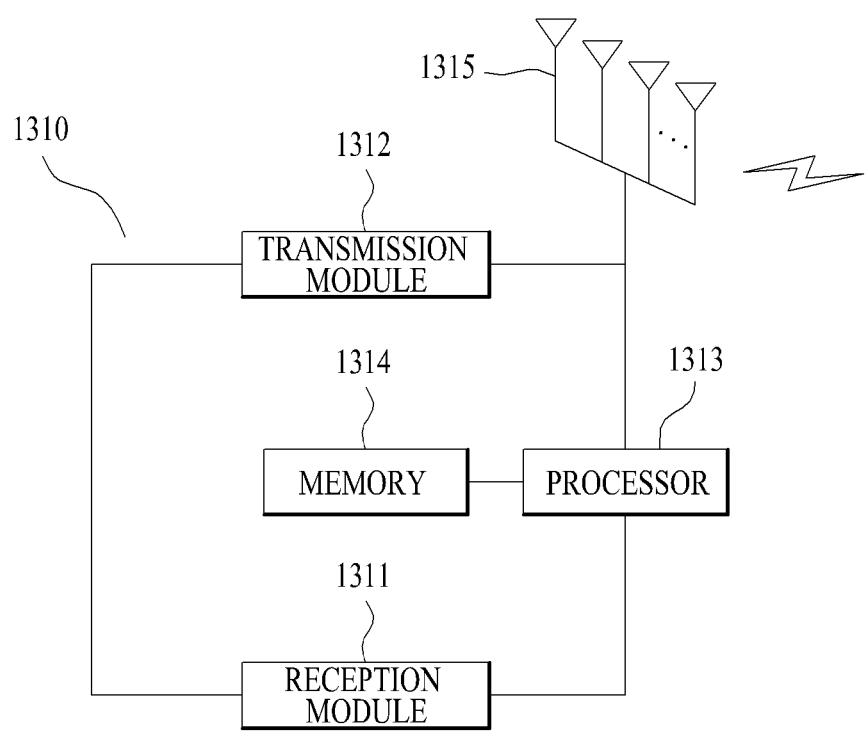
FIG. 13 illustrates a configuration of a transceiver according to an embodiment of the present invention.

FIG. 9 illustrates another example of PUCCH reporting mode 2-1 according to He (i.e. H0) when PTI=0. The example shown in FIG. 13 is based on the assumption that J=3, K=2 and $M_m$=1. In this case, the RI reporting period is $M_{RI} * H_1 * N_p = 1 * (J*K+1) * N_p = 7*N_p$. That is, the RI and PTI are reported at interval of 7 reporting period ($7*N_p$) and W1 reporting or W2 and CQI reporting is performed at seven CSI transmission timings in the reporting period. The W1 reporting period is determined by $H_0$ signaled through the higher layer.

FIG. 9(a) shows a case in which $H_0$ is set to 2 by the higher layer. That is, W1 is reported at intervals of $2*N_p$ and WB W2 and WB CQI are reported at the remaining CSI reporting timings. In this case, W1 and W2/CQI are alternately reported in every $N_p$-th subframe. Accordingly, when W1 reporting follows first RI/PTI reporting, W2/CQI is reported after the next RI/PTI report.

FIG. 9(b) shows a case in which $H_0$ is set to 4 by the higher layer. That is, W1 is reported at intervals of $4*N_p$ and WB W2 and WB CQI are reported at the remaining CSI reporting timings. That is, a pattern in which W1 is reported once and W2/CQI is reported three times is repeated. In this case, when W1 reporting follows first RI/PTI reporting, W2/CQI is reported after the next RI/PTI report.

In the example shown in FIG. 9, it may be assumed that a rank value of 1 is reported through the first RI/PTI report and a changed rank value of 2 is reported through the second RI/PTI report. In this case, W2/CQI is reported without W1 reporting after the second RI/PTI report. According to the current PUCCH reporting scheme, the W2/CQI is determined/calculated on the basis of the most recently reported W1. The most recently reported W1 corresponds to W1 suitable for the rank value of 1 and is not suitable for the changed rank value of 2. Accordingly, when W2/CQI reporting is performed without W1 reporting after RI/PTI reporting, W2/CQI corresponds to invalid CSI since it is not determined/calculated based on the rank value suitable for the current channel. Furthermore, W1 reporting is not frequent and thus reliability of W1 reporting may be deteriorated. Accordingly, a method for improving reliability of W1 reporting while achieving correct CSI determination/calculation is needed. Examples of the present invention will now be described.

According to an embodiment of the present invention, CSI reported first after reporting of RI/PTI corresponding to PTI=0 can always be determined as W1. FIG. 10 illustrates operation according to PUCCH reporting mode 2-1 according to an embodiment of the present invention.

In the example of FIG. 10(a), while W1 reporting and W2/CQI reporting are performed upon determination of W1 reporting timing and W2/CQI reporting timing based on a W1 reporting period (e.g. $H_0$), it is possible to override W2/CQI reporting such that W1 is reported at CSI reporting timing immediately after reporting of RI/PTI corresponding to PTI=0. That is, even if W2/CQI is scheduled to be reported at the CSI report timing immediately after reporting of RI/PTI corresponding to PTI=0 according to reporting order determined based on $H_0$, it is possible to override W2/CQI reporting and report W1 all the time.

In the example of FIG. 10(b), while W1 reporting and W2/CQI reporting are performed upon determination of W1 reporting timing and W2/CQI reporting timing based on a W1 reporting period (e.g. $H_0$), it is possible to drop CSI other than W1 at CSI report timing immediately after reporting of RI/PTI corresponding to PTI=0. That is, when W2/CQI is reported at the CSI report timing immediately after reporting of RI/PTI corresponding to PTI=0 according to reporting order determined based on $H_0$, W2/CQI is dropped. At subsequent CSI reporting timings, CSI other than W1 is dropped and W1 is reported. That is, CSI reported first after reporting of RI/PTI corresponding to PTI-0 (except for report timing at which no CSI is reported) can be W1 all the time.

According to the examples of FIGS. 10(a) and 10(b), since CSI reported first after RI/PTI reporting is always W1 even when a rank value, which has been changed from the previous rank value, is reported at reporting timing of RI/PTI corresponding to PTI=0, subsequently reported CSI (i.e. CSI determined/calculated based on most recently reported W1) is valid.

According to another embodiment of the present invention, when RI/PTI corresponding to PTI=1 is reported at RI/PTI reporting timing following reporting of RI/PTI corresponding to PTI=0, subsequent CSI can be determined/calculated on the basis of a rank value corresponding to PTI=0 that is most recently reported. The present embodiment can solve a problem generated when a rank value with respect to reporting of RI/PTI corresponding to PTI=1 has been changed from the previously reported rank value. The embodiment described with reference to FIG. 10 relates to the method of modifying a CSI reporting period, whereas the present embodiment relates to a method of modifying assumption of CSI determination/calculation while determining the CSI reporting period according to the conventional method.

Figure 11:
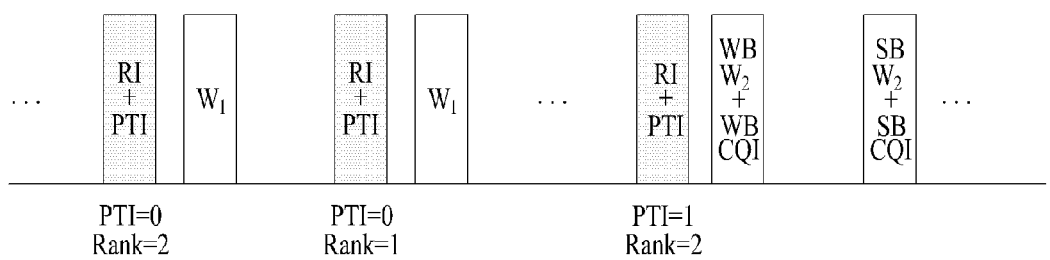

In the example of FIG. 11, it is assumed that PTI is reported as 0 and rank is reported as 2 in the initial RI/PTI reporting and then PTI is reported as 0 and rank is reported as 1 in the subsequent RI/PTI reporting. In this case, if PTI is reported as 1 and rank is reported as 2 in the following RI/PTI reporting, then subsequently reported WB W2/CQI and SB W2/CQI can be determined/calculated on the basis of the rank of 1 which corresponds to the most recently reported RI/PTI corresponding to PTI=0 rather than the rank of 2. If WB/SB W2/CQI is determined/calculated on the assumption that the rank is 2 which corresponds to RI/PTI reported as PTI=1, then WB/SB W2/CQI is determined/calculated based on most recently reported W1. In this case, since the most recently reported W1 is determined on the assumption that the rank is 1, such assumption does not correspond to the aforementioned assumption of WB/SB W2/CQI determination/calculation and thus WB/SB W2/CQI corresponds to invalid CSI. Accordingly, when determination/calculation of CSI reported in the reporting period of RI/PTI corresponding to PTI=1 is based on a rank value with respect to most recently reported RI/PTI corresponding to PTI=0, the CSI determination/calculation can be based on the same rank as that corresponding to the most recently reported W1.

In addition, when RI/PTI corresponding to PTI=1 is reported and then RI/PTI corresponding to PTI=1 is reported in the next period, CSI can be determined/calculated based on the rank corresponding to the most recently reported PTI=1. Otherwise, when RI/PTI corresponding to PTI=1 is reported and then RI/PTI corresponding to PTI=1 is reported in the next period, CSI can be determined/calculated based on the rank corresponding to the most recently reported PTI=1 from among RI/PTI reports corresponding to the same rank as the current rank. In addition, when RI/PTI corresponding to PTI=1 is reported and then RI/PTI corresponding to PTI=0 is reported in the next period, CSI can be determined/calculated based on the rank reported at the corresponding report timing.

Figure 12:
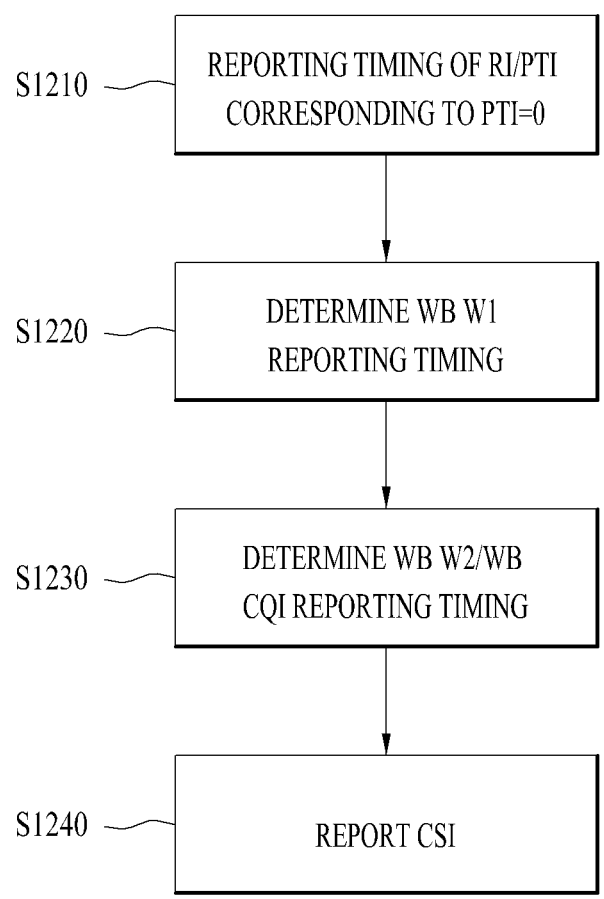
FIG. 12 illustrates a method for reporting CSI according to an embodiment of the present invention.

A description will be given of a method for reporting CSI according to a preferred embodiment of the present invention with reference to FIG. 12.

A UE may determine reporting timing of RI/PTI corresponding to PTI=0 in step S1210. For example, an RI/PTI reporting subframe can be determined according to Equation 13.

The UE may determine WB W1 reporting timing in step S1220. For example, a WB W1 reporting subframe can be determined according to Equation 12.

The UE may determine WB W2 and WB CQI reporting timing in step S1230. For example, reporting of WB W2 and WB CQI at CSI reporting timing between two consecutive WB W1 reports can be determined.

The UE may report corresponding CSI at the determined reporting timings in step S1240. Here, it can be configured that CSI reported first after reporting of RI/PTI corresponding to PTI=0 is WB W1. Simultaneously or separately, CSI reported after reporting timing of RI/PTI corresponding to PTI=1 can be determined/calculated on the basis of a rank value with respect to most recently reported RI/PTI corresponding to PTI=0.

In the CSI reporting method according to the present invention, described with reference to FIG. 12, the above-described embodiments may be independently applied or two or more thereof may be simultaneously applied and redundant description is omitted for clarity.

The principle proposed by the present invention is equally applicable to channel state information feedback for MIMO transmission between a base station and a relay (on backhaul uplink and backhaul downlink) and MIMO transmission between a relay and a UE (on access uplink and access downlink).

FIG. 13 illustrates a configuration of a transceiver according to an embodiment of the present invention.

Referring to FIG. 13, a transceiver 1310 according to an embodiment of the present invention may include a reception module 1311, a transmission module 1312, a processor 1313, a memory 1314 and a plurality of antennas 1315. The antennas 1315 refer to a transceiver supporting MIMO transmission/reception. The reception module 1311 may receive signals, data and information from an external device and the transmission module 1312 may transmit signals, data and information to the external device. The processor 1313 may control overall operation of the transceiver 1310.

The transceiver 1310 according to an embodiment of the present invention may be a UE that reports CSI for a downlink channel from a BS. The processor 1313 of the UE may be configured to determine report timing of RI corresponding to PTI=0, wideband first PMI (WB W1) report timing, wideband second PMI (WB W2) report timing and wideband CQI (WB CQI) report timing. In addition, the processor 1313 may be configured to report CSI through the transmission module on the basis of the result of report timing determination. Here, it can be configured that CSI initially reported after report timing of RI corresponding to PTI=0 corresponds to the wideband first PMI.

Furthermore, the processor 1313 of the transceiver 1310 may process information received by the transceiver 1310, information transmitted from the transceiver 1310 to the outside, etc. The memory 1314 may store processed information for a predetermined time and may be replaced by a component such as a buffer (not shown).

In configuration of the transceiver may be configured such that the above-described various embodiments are independently applied or two or more thereof are simultaneously applied, and redundant description is omitted for clarity.

In the description of FIG. 13, the description of the base station may be equally applied to a relay corresponding to a downlink transmitting entity or an uplink reception entity and the description of the UE may be equally applied to a relay corresponding to a downlink reception entity or an uplink transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described method and apparatus for efficiently reporting CSI according to the above-described embodiments of the present invention are applicable to various mobile communication systems using multiple antennas.

The invention claimed is:

1. A method for reporting channel state information (CSI) by user equipment (UE) in a wireless communication system, the method comprising:
   determining reporting timing of a rank indicator (RI) corresponding to a precoding type indicator (PTI) having a value of 0;
   determining reporting timing of a wideband first precoding matrix indicator (PMI);
   determining reporting timing of a wideband second PMI and wideband channel quality indicator (CQI); and
   reporting the CSI based on the result of the reporting timing determinations,
   wherein CSI subsequent to the determined reporting timing of the RI corresponding to the PTI having the value of 0 is the wideband first PMI,
   wherein reporting of the wideband second PMI and wideband CQI is dropped after the determined reporting timing of the RI corresponding to the PTI having the value of 0, and
   wherein the wideband first PMI is reported instead of the dropped wideband second PMI and wideband CQI at a CSI reporting timing immediately after the determined reporting timing of the RI corresponding to the PTI having the value of 0.

2. The method according to claim 1, wherein a reporting period of the wideband first PMI is $H_0 * N_p$, and
   wherein $H_0$ is a value signaled by a higher layer and $N_p$ is a CSI reporting timing interval.

3. The method according to claim 1, Wherein the reporting timing of the wideband second PMI and wideband CQI is determined as CSI reporting timing between two consecutive wideband first PMI reporting timings.

4. The method according to claim 1, wherein a reporting period of the RI is $H_1 * N_p * M_{RI}$, and
   wherein $H_1 = J*K+1$, J denotes the number of bandwidth parts, K is set by higher layer signaling, $N_p$ is a CSI reporting timing interval, $M_{RI}$ is a multiple of a wideband CQI and a PMI reporting period for a PTI having a value of 1.

5. The method according to claim 1, wherein CSI reported after reporting timing of an RI corresponding to a PTI having a value of 1 is determined or calculated on the basis of a rank value of a most recently reported RI corresponding to the PTI having the value of 0.

6. The method according to claim 1, wherein a rank value with respect to an RI report corresponding to a PTI having a value of 1 is changed from a previous rank value.

7. The method according to claim 1, wherein the CSI is periodically reported.

8. The method according to claim 1, wherein the CSI report is transmitted using a physical uplink control channel (PUCCH).

9. A user equipment (UE) for reporting channel state information (CSI) in a wireless communication system, the UE comprising:
   a transceiver configured to receive a downlink signal from a base station and transmit an uplink signal to the base station; and
   a processor configured to control the UE including the transceiver,
   wherein the processor is configured to:
      determine reporting timing of a rank indicator (RI) corresponding to a precoding type indicator (PTI) having a value of 0,
      determine reporting timing of a wideband first precoding matrix indicator (PMI),
      determine reporting timing of a wideband second PMI and wideband channel quality indicator (CQI), and
      report the CSI based on the result of the reporting timing determinations,
   wherein CSI subsequent to the determined reporting timing of the RI corresponding to the PTI having the value of 0 is the wideband first PMI,
   wherein reporting of the wideband second PMI and wideband CQI is dropped after the determined reporting timing of the RI corresponding to the PTI having the value of 0, and
   wherein the wideband first PMI is reported instead of the dropped wideband second PMI and wideband CQI at a CSI reporting timing immediately after the determined reporting timing of the RI corresponding to the PTI having the value of 0.

* * * * *